E. W. COMFORT.
THERMOSTAT.
APPLICATION FILED JULY 30, 1903.
912,286.
Patented Feb. 16, 1909.
2 SHEETS—SHEET 1.
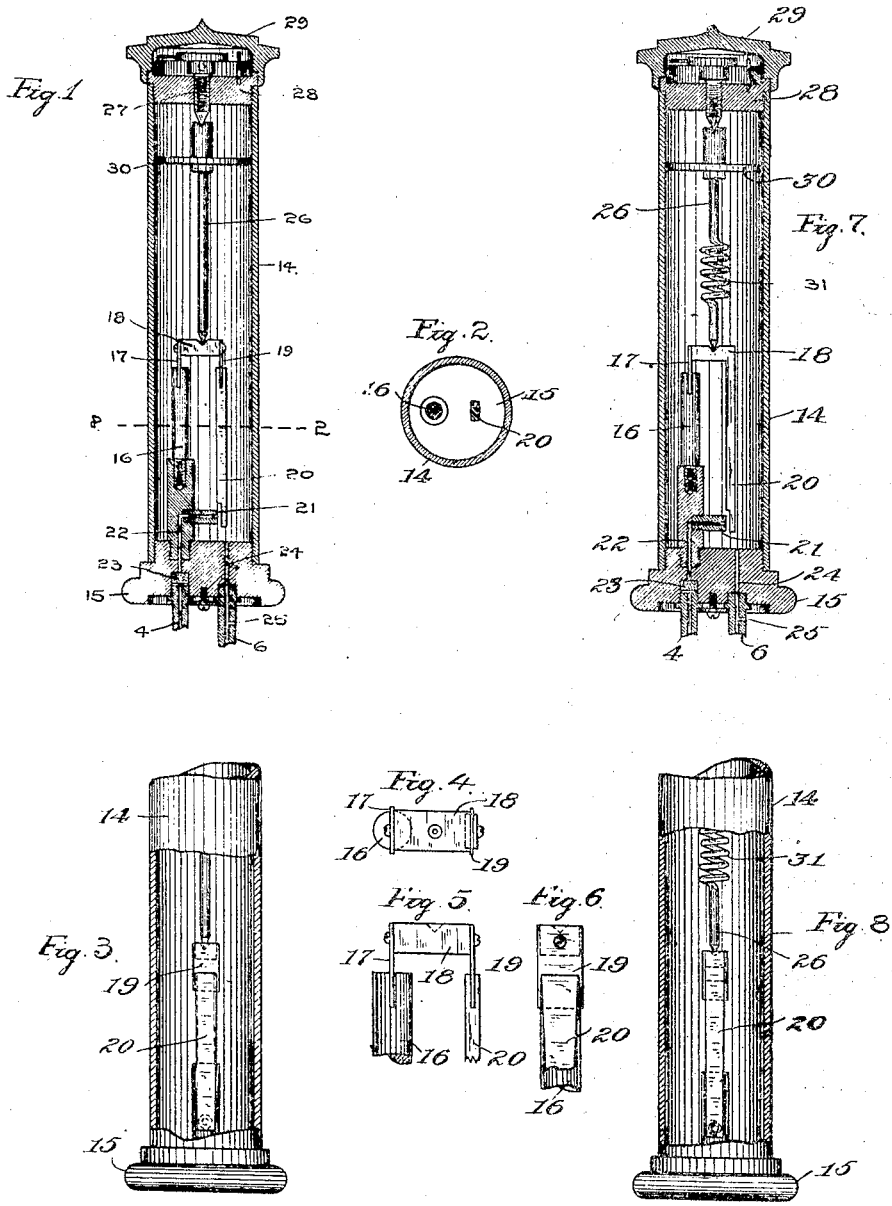
WITNESSES:
INVENTOR
Edward W. Comfort
BY Jones & Addington
ATTORNEYS

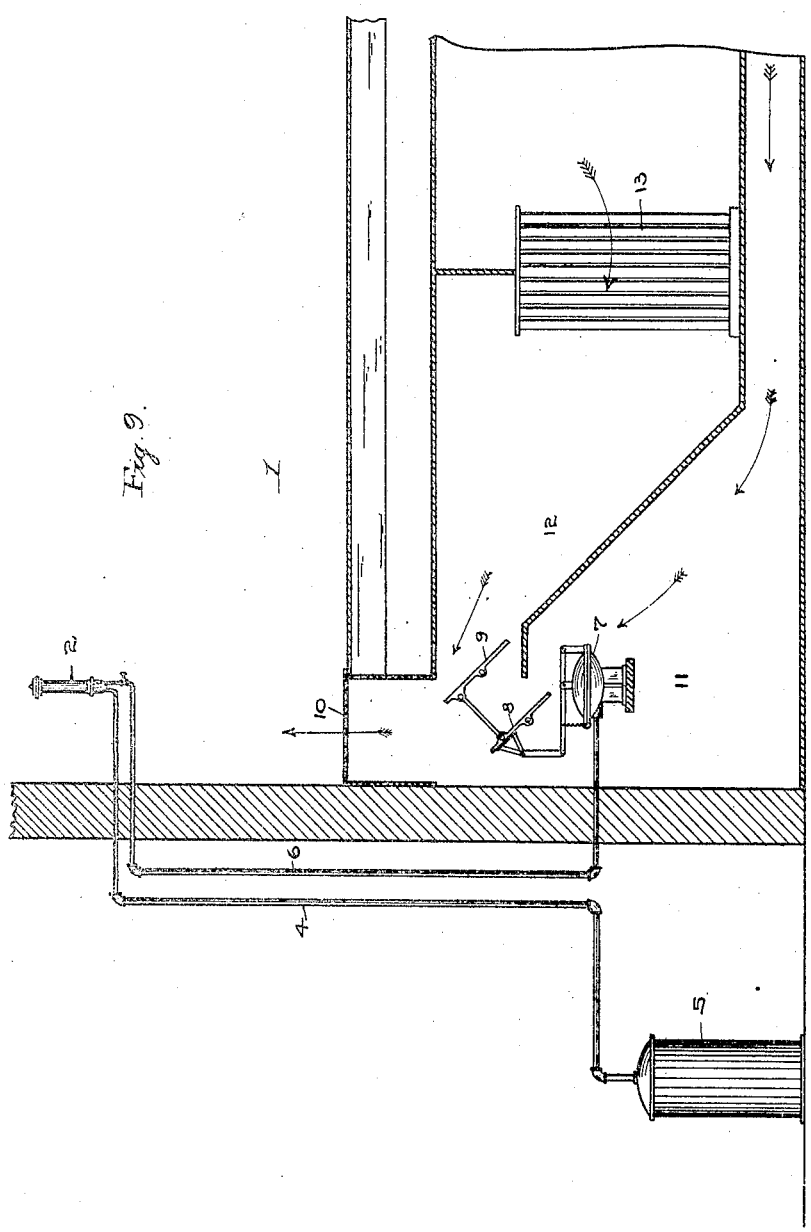

UNITED STATES PATENT OFFICE.

EDWARD W. COMFORT, OF CHICAGO, ILLINOIS, ASSIGNOR TO NATIONAL REGULATOR COMPANY, OF CHICAGO, ILLINOIS, A CORPORATION OF ILLINOIS.

THERMOSTAT.

No. 912,286.  Specification of Letters Patent.  Patented Feb. 16, 1909.

Application filed July 30, 1903. Serial No. 167,547.

*To all whom it may concern:*

Be it known that I, EDWARD W. COMFORT, citizen of the United States, residing at Chicago, in the county of Cook and State of Illinois, have invented a certain new and useful Improvement in Thermostats, of which the following is a full, clear, concise, and exact description, reference being had to the accompanying drawing, forming a part of this specification.

My invention relates to apparatus for automatically controlling the temperature in buildings and other places. In that class of such apparatus in which the heating and ventilation of the apartment are effected through the medium mixture of hot and cold air, dampers are generally arranged in the passages or ducts for the hot and cold air. These dampers are operated by a fluid pressure motor to vary the respective quantities of hot and cold air admitted to the apartment. The motor is supplied with fluid under pressure from a suitable source and a thermostatic element arranged within the apartment controls a valve which regulates the flow of fluid under pressure admitted to the motor. The best results in controlling the temperature and producing proper ventilation of the apartment are attained by gradually varying the relative quantities of hot and cold air admitted, as suddenly changing the proportions of the mixture of hot and cold air, or admitting only one or the other at a time, produces too rapid a change in the temperature and does not effect uniform regulation. It is therefore sought to have the motor gradually change the position of the dampers under variations of the temperature in the apartment, but the usual form of motor employed will not gradually change the position of the dampers unless the action of the thermostatic element upon the valve which regulates the pressure supplied to the motor, is modified.

One form of thermostat for regulating the pressure supplied to the motor, so as to produce a gradual change in the position of the dampers, I have described and claimed in Patent No. 837,260 issued to me November 27, 1906. In that patent I have shown a thermostat in which the pressure supplied to the motor acts upon a Bourdon tube to produce a movement of the valve independent of that effected by the thermic action.

It is the design of the present invention to simplify the construction and reduce the cost of manufacture of a thermostat which will regulate the pressure supplied to the motor in such a manner as to cause the motor to produce a gradual change in the position of the dampers which control the admission of hot and cold air to the apartment.

I construct my thermostat, in its preferred form, with a valve actuated by a thermostatic element and inclosed within a suitable casing, and with means which permits an action of said valve independent of that produced by said thermostatic element and dependent upon the relative pressures within the inclosing casing and the fluid supply pipe.

For the purpose of revealing my invention, I have, in the accompanying drawings, illustrated two form thereof, but as my invention may be embodied in many constructions, I do not desire to limit myself to any specific device, except as is particularly set out in the claims.

In said drawings: Figure 1 is a view of my improved thermostat with parts thereof in section: Fig. 2 is a cross section on the line 2—2 of Fig. 1; Fig. 3 is a partial sectional view of the lower portion of my thermostat; Fig. 4 is a plan view of the valve support; Fig. 5 is an elevation of the upper part of the valve support; Fig. 6 is a side view of the part shown in Fig. 5; Fig. 7 is a sectional elevation of a modification of the preferred embodiment of my invention; Fig. 8 is a partial sectional view of the lower portion of the device shown in Fig. 7, and Fig. 9 is a diagrammatic view showing one form of my improved apparatus arranged for controlling the temperature and ventilation of an apartment.

Throughout the accompanying drawings, like reference characters designate similar and corresponding parts.

Referring first to Fig. 9, in a room 1 to be heated is arranged my improved thermostat 2, which is connected by a pipe 4 with a tank 5 containing fluid under pressure, and by another pipe 6, with a motor 7. The dampers 8 and 9 are operated by the motor to vary the relative quantities of hot and cold air supplied to the room through a register 10, the damper 8 being arranged to regulate the quantity of cold air delivered from the cold air duct 11, and the damper 9 being arranged to regulate the quantity of hot air delivered from the hot air chamber 12, in which the air is heated, preferably by a steam coil 13.

The particular construction of my preferred form of improved thermostat is illustrated in Figs. 1 to 6 inclusive of the drawings. The thermostat has a tube or chamber 14 of hard rubber or any other material highly responsive to temperature changes. The lower end of the tube preferably has screwed thereinto a plug 15 from which a post 16 projects into the tube. Extending from the upper end of said post is a preferably flat spring 17 which supports a block 18, having depending therefrom a preferably flat spring 19 which carries a valve arm 20, the lower end of which constitutes a valve. The seat 21 for the valve has a port or passage 22 extending to the pipe 4 connected with the plug 15, there being provided in said port or passage a filter 23. The spring 17 is so "set" as to tend to normally hold the valve away from the seat, as illustrated, while the "set" of the spring 19 is such that it tends to move the valve toward its seat against the flow of fluid therefrom. The pipe 4, as before explained, leads to the tank containing fluid under pressure, or any other suitable source of supply of fluid under pressure. The other pipe 6, leading to the motor, is also connected with the plug 15 and communicates with a port 24 which extends through said plug and opens into the chamber within the tube 14, said pipe being provided with a vent 25 of somewhat less dimensions than the passage in said pipe and the port 24. Upon the top of the block 18 bears the lower end of a pin or rod 26, and upon the upper end of said pin bears the point of a screw 27 which passes through a plug 28, preferably threaded into the upper end of the tube 14. In assembling the parts of the thermostat, the pin or rod 26, after being set upon the block, is held in a central position by the disk or plate 30, which engages the inner walls of the tube, until the screw is brought to bear upon the top of said pin. By turning the screw the position of the valve relative to its seat may be adjusted. After the screw has been set, it is preferably covered with a cap or casing 29 threaded upon the plug 28, to give the thermostat a finished appearance and to protect the screw.

In the operation of the apparatus the tube or thermostatic element 14 will expand and contract under rise and fall of the temperature, and in so doing it will move the block 18, by bending the spring 17, through the agency of the pin 26, thus varying the pressure exerted by the spring 19 upon the valve 20, and consequently varying the quantity of air permitted to escape from the tank through the port 22, and to pass from the chamber of the thermostat to the motor through the pipe 6. In other words, the energy which is stored in the spring 19, and which tends to close the valve against the flow of fluid into the chamber, is varied to correspond to changes in the temperature of the room. If air is allowed to pass the valve from the tank to the motor for a sufficient length of time the pressure in the motor will become the same as the pressure in the tank, and, consequently, the pressures upon both sides of the valve will be equal. That is to say, the pressure in the chamber of the thermostat, or on the motor side of the valve, will be equal to that in the tank, or on the supply side of the valve. With the full pressure present in the motor the dampers will be moved into, and held in, such a position that the quantity of cold air supplied to the room will be greatly increased, while the quantity of hot air will be decreased. This will result in the lowering of the temperature of the room, which will cause the thermostatic element 14 to contract and depress the block 18, increasing the tendency of the spring 19 to close the valve upon the port leading from the tank and shut off the air supply.

Referring to the pressure from the tank as the "supply" pressure and to the pressure in the closed chamber, that is, the motor pressure, as the "back" pressure, it will be noted that the "effective" pressure tending to open the valve will be equal to the supply pressure less the back pressure. The tendency of the valve to open, due to the effective pressure, is opposed by the spring 19, which will be termed the "balancing" or "energy storage" spring, to distinguish it from the supporting spring 17. The supply pressure is practically constant, but the back pressure would gradually fall if the valve remained closed, this being due to the escape of fluid through the vent 25. To compensate for this the valve must remain slightly open, or must open and close in rapid succession. The regulation results from the balancing and unbalancing action of the two opposing forces, that is, the effective pressure and the power of the energy-storing spring, to which the valve is subjected.

For the purpose of illustration let it be assumed that the temperature of the apartment in which the thermostat is placed is to be kept at 70° F. At this temperature the thermostatic tube will assume a definite length, and for this length of the tube the parts will assume such a position that the valve, by remaining slightly open or by repeatedly opening and closing in rapid succession, will permit the passage of fluid to the closed chamber, and to the motor, at such a rate as to maintain therein a definite pressure, notwithstanding the constant leakage through the vent port 25. The effective fluid pressure and the spring pressure are now nicely balanced, the valve opening more or less as the one or the other predominates, and maintaining a practically constant pressure in the pipe leading to the motor, thus holding the valve or damper controlled by the motor in a definite position so long as the temperature in the room remains at the desired point of 70° F. Assuming, now, that the temperature rises to 71°; the thermostatic tube will expand accordingly, thereby relieving somewhat the pressure on the block 18 and decreasing the pressure exerted by the spring 19. Since the effective fluid pressure is now greater than the opposing force of the power storage spring 19, the valve is moved away from its seat by the fluid to admit more fluid to the chamber, thus increasing the back pressure by permitting fluid to flow in faster than it can escape through the vent 25. As the back pressure rises, the flow of fluid into the chamber through the valve port is opposed more and more, until at length the effective pressure, or the pressure at the port, is reduced to such an extent that it is again balanced by the pressure of the spring. The pressure in the chamber and motor is now maintained constant but higher than before, the escape of fluid through the vent port 25 being greater than before, but being compensated for by the increased flow of fluid into the chamber through the valve port. The increased back pressure has caused the motor diaphragm to move to a new position, moving with it the heat damper or valve to a position wherein less heat is supplied to the room, and holds the same at this position until the temperature has fallen to the desired 70°. If the temperature falls below the assumed desired point of 70°, the thermostatic tube, by contracting, increases the power stored in the spring 19, which soon begins to dominate the effective pressure and move the valve toward the inlet port, thereby permitting the back pressure to fall, due to the escape of fluid through the vent port 25 faster than it enters at the valve port. The resulting increase in the effective pressure soon causes the latter to again balance the power of the spring 19, when the back pressure will be maintained constant to hold the heat damper or valve in a new position so long as the temperature remains at 69°. The back or motor pressure is now lower than when the temperature was at 70°, and therefore, the escape of fluid through the vent port 25 is less rapid, being, however, exactly compensated for by the decreased flow of fluid through the valve port. When the thermostatic element tends to move the valve to close the port, the movement of the valve will be slower as the effective pressure at the inlet port becomes greater, and conversely, when the thermostatic element permits the valve to move in the opposite direction, the opening of the valve will be slower as the effective pressure becomes less. For this reason the movement of the valve under the action of the thermostatic element is materially retarded or modified so that the pressure at the motor is varied in such a manner as to cause the positions of the dampers to be gradually changed, when variation in the temperature in the apartment takes place. Under ordinary conditions the movement of the dampers is hardly perceptible, since such uniform regulation results from use of this thermostat that the expansion and contraction of the tube or thermostatic element is very slight.

The above analysis of the operation of my device makes it plain that the heat responsive element serves to vary the tension of the balancing spring 19 and that, therefore, the back pressure is automatically readjusted until the effective fluid pressure reaches a condition of equilibrium with respect to the spring pressure. The movement of the fluid supply valve is thus modified and instead of following the precise movement of the thermostatic element, partakes of a retarded movement, due to the tension of the balancing spring, which prevents the valve from moving in a direction to open or to close the port as rapidly as would be the case were the valve connected directly and unyieldingly to the thermostatic element.

The back pressure or motor pressure never acts in opposition to the thermostatic pressure, but in unison with it and supplementary thereto, thus when the thermostatic tube contracts, tending to close the valve 21, the back pressure acts in unison, also tending to close the valve.

It will be seen that whereas in the device of Patent No. 837,260, heretofore mentioned, I have provided means in the form of a Bourdon tube to respond to the motor or back pressure to modify the movement of the fluid supply valve, I have entirely eliminated such means in the present structure, and by balancing the effective fluid pressure against a spring whose tension is automatically varied by the thermostatic element, I accomplish a gradual movement of the heat damper or valve and maintain the heat damper or valve absolutely fixed in position so long as the temperature remains constant. Moreover, I retain the advantageous features of my above mentioned prior device, wherein the thermostatic element is permitted to move unimpeded throughout its entire range of travel when the temperature changes, the movement of the fluid supply valve alone being modified. In my said prior patent I have pointed out the advantage of this structure over those structures of the prior art wherein the valve is rigidly connected with the thermostatic element and wherein means are provided for modifying the movement of the thermostatic element itself.

In Fig. 7 is illustrated another form of thermostat embodying my improvements. Instead of the valve arm 20 being flexibly connected with the block 18, as in the other construction, it is rigidly connected therewith, and the retardation of the movement of said valve under the thermic action by variation in the pressure upon the valve of the fluid in the supply pipe due to the variation in the pressure of the fluid in the thermostatic tube is permitted by the coil spring 31 which makes the pin 26 yieldingly press upon the block 18.

It is obvious that my invention may be embodied in many mechanisms, and that the devices shown herein for the purpose of disclosing my invention, are susceptible of many changes, and, therefore, I do not wish to be limited in my invention except as I particularly specify in the appended claims, and where in the said claims I have referred to "a valve" I contemplate not only a single valve, but any valve combination or valve mechanism capable of accomplishing substantially similar results. Furthermore, my improved thermostat may be arranged in any system of apparatus for controlling temperatures wherein its use will produce advantageous results, and by a different arrangement of the valve and the ports leading into the interior of the valve chamber, the changes in pressure on opposite sides of the valve may accelerate the movement of said valve instead of retarding the same.

By reversing the connections carrying the fluid pressure to and away from the thermostat, the pipe 6 becoming the supply pipe and pipe 4 the pipe carrying fluid to the motor and having in it the restricted opening 25, the action of the valve will become positive and the action of the motor will be accelerated instead of being retarded.

Having thus described my invention, what I claim as new and desire to secure by Letters Patent, is:

1. The combination with a source of fluid pressure, of a motor actuated thereby, a valve controlling the pressure to which the motor is subjected, a balancing and energy-storing device associated with and tending to close said valve and adjusted to balance the effective fluid pressure to which the valve is subjected, and a thermostatic element for varying the energy stored in said storage device to thereby vary, in response to temperature changes, the fluid pressure to which the motor is subjected.

2. The combination with a source of fluid pressure, of a motor actuated thereby, a valve controlling the pressure to which the motor is subjected and arranged so that the valve is acted upon by the effective fluid pressure, a balancing and energy storage device associated with and tending to close said valve and adjusted to balance the effective fluid pressure to which the valve is subjected, and a thermostatic element for varying the energy stored in said storage device to thereby vary, in response to temperature changes, the fluid pressure to which the motor is subjected.

3. The combination with a source of fluid supply, of a motor supplied with fluid thereby, a valve for varying the fluid pressure to which the motor is subjected, an energy storage device tending to close said valve and adjusted to be balanced against the effective fluid pressure exerted upon said valve, and a thermostat for varying the energy stored in said storage device to thereby vary, in response to temperature changes, the fluid pressure to which the motor is subjected.

4. The combination with a source of fluid supply, of an inclosed valve controlling the passage of the fluid from said source, the inclosure having a vent leading therefrom, a motor communicating with said inclosure, a storage spring inclosed with said valve and adjusted to be balanced against the effective fluid pressure exerted upon said valve, and a thermostat for varying the energy stored in said spring to thereby vary, in response to temperature changes, the fluid pressure to which the motor is subjected.

5. The combination with a thermostat having a chamber therein, of a source of fluid supply connected with said chamber, a valve adapted to control the flow of such fluid to the chamber, said chamber having a vent leading therefrom, a motor operated by the fluid from said source of fluid supply, and a storage spring within the chamber associated with said valve, said thermostat serving to vary the energy stored in said spring to thereby vary, in response to temperature changes, the fluid pressure to which the motor is subjected.

6. The combination with a thermostat having a chamber therein, of a source of fluid supply connected with said chamber, a valve controlling the variations of pressure from said source within the chamber, said chamber having a vent leading therefrom, a motor operated by the fluid from said source of fluid supply, and a storage spring within the chamber associated with said valve and adjusted to be balanced against the effective fluid pressure exerted upon said valve, said thermostat serving to vary the energy stored in said spring to thereby vary, in response to temperature changes, the fluid pressure to which the motor is subjected.

7. The combination with means for conveying a fluid, of a valve governing the flow of said fluid, an energy-storing spring associated with and tending to close said valve and adjusted to be balanced against the effective fluid pressure exerted on said valve, and a thermostat for varying the energy stored in said spring.

8. The combination with means for conveying a fluid, of a valve governing the flow of said fluid and being under the influence of the fluid pressure on both sides thereof, an energy-storing spring associated with and tending to close said valve and adjusted to be balanced against the effective fluid pressure exerted on said valve, and a thermostat for varying the energy stored in said spring.

9. The combination with a source of supply of fluid under pressure, of a motor having a vent, means for conducting fluid from said source of supply to said motor and comprising a chamber, a port through which the fluid passes to said chamber, a valve for closing said port, resilient means tending to move said valve toward said port, and thermostatically actuated means for varying the power applied by said last-named means to move said valve.

10. The combination with a source of supply of fluid under pressure, of a motor having a vent, means between said source of supply and said motor for controlling the flow of fluid to said motor, said means comprising a valve subjected to pressure on opposite sides, elastic means tending to close said valve, and thermostatically actuated means for gradually varying the power applied by said last-named means to said valve.

11. The combination of a source of supply of fluid under pressure, a motor having a vent, means for controlling the flow of fluid from said source of supply to said motor, said means comprising a chamber in communication with said source of supply and said motor, a valve in said chamber subjected to the supply pressure on one side and to the motor pressure on the opposite side, elastic means tending to close said valve against the supply pressure to cut off the flow of fluid from said source of supply, and thermostatically controlled means for varying the force applied by said last-named means.

12. The combination of a source of supply of fluid under pressure, a motor vented to the atmosphere, means for conducting fluid from said source of supply to said motor, a valve located in the path of movement of the fluid and surrounded by said fluid, said valve being arranged to close against the direction of movement of the fluid, elastic means tending to close said valve, and thermostatically-actuated means for varying the force applied by said last-named means.

13. The combination of a vented motor, a source of fluid supply and means for controlling the flow of fluid to said motor, said means having a chamber in communication with said motor and a valve in said chamber for governing the flow of fluid to said chamber, said valve being subjected to both the supply pressure and the pressure within said chamber, a thermostatic element arranged to close said valve, and a power storage device interposed between said thermostatic element and said valve.

14. The combination of a vented motor, a source of fluid supply, and means for controlling the flow of fluid to said motor, said means having a chamber in communication with said motor and a valve in said chamber for governing the flow of fluid to said chamber, said valve being subjected to both the supply pressure and the pressure within said chamber, a thermostatic element adapted to close said valve, and a spring interposed between said element and said valve.

15. The combination of a vented motor, a source of fluid supply and means for controlling the flow of fluid to said motor, said means having a chamber in communication with said motor and a valve in said chamber for governing the flow of fluid to said chamber, said valve being subjected to the pressure within said chamber, a thermostatic element arranged to control said valve, and a yielding element interposed between said thermostatic element and said valve.

16. The combination with a source of supply of fluid under pressure, of a motor, means for conducting fluid from said source of supply to said motor, and means for controlling the flow of fluid to said motor comprising a valve arranged to close in a direction opposite the direction of movement of the fluid, a spring for closing said valve, and thermostatically controlled means for varying the strength of said spring.

In witness whereof, I have hereunto subscribed my name in the presence of two witnesses.

EDWARD W. COMFORT.

Witnesses:
F. E. NEWTON,
E. EDMONSTON, Jr.